2,914,529
MONO AMINOETHERS OF TRIPHENYL ETHYLENES

Robert E. Allen, Wyoming, and Frank P. Palopoli and Edward L. Schumann, Cincinnati, Ohio, and Marcus G. Van Campen, Jr., Berkeley, Calif., assignors to The Wm. S. Merrell Company No Drawing. Application September 5, 1957
Serial No. 682,073

6 Claims. (Cl. 260—247.7)

Our invention relates to new chemical compounds which may be regarded as derivatives of triphenylethanols, triphenylethylenes and triphenylethanes. They are distinguished, in general, by their anti-estrogenic activity in the endocrine system, anti-inflammatory activity, gonadotrophic activity and activity in decreasing blood cholesterol levels. Some of the compounds possess various combinations of these properties.

As estrogen antagonists, the compounds are useful in the treatment of hyperestrogenism and disorders related to this condition, e.g., endometriosis, functional bleeding, Kleinfelter's syndrome, dysmenorrhea, menopausal dysfunction, and similar conditions. They are active both orally and parenterally and so can be administered by either route, though the oral route is preferred in most instances. Some of the compounds have a high degree of activity as estrogen antagonists. Some of the compounds with anti-estrogenic activity are also uterotrophic.

As anti-inflammatory agents, the compounds are useful in alleviating the symptoms of such collagen diseases as arthritis and rheumatism and in the topical treatment of inflammation. Some of the compounds possess the novel combination of anti-inflammatory and anti-estrogenic activities and are especially advantageous for this reason.

As blood cholesterol depressants, the compounds are useful in the treatment of atherosclerosis.

As gonadotrophic inhibition agents, the compounds are useful for the treatment of fertility and sterility problems and can be administered orally or parenterally for this purpose.

The compounds can be used orally and parenterally in doses ranging between 25 mg. and 2–4 grams daily, depending on the condition under treatment. For topical use, the compounds can be incorporated into creams, ointments or lotions in concentrations of up to 10 percent. In aerosol sprays, the concentration can be in the order of about 0.05 to 1 percent.

The compounds can be isolated and are generally useful in the form of their salts with mineral acids, such as hydrochloric or hydrobromic acid or with organic acids such as citric, oxalic or the like. They can be used as the base, however.

The compounds of our invention are derivatives of triphenylethanols, triphenylethylenes and triphenylethanes in which one of the phenyl groups is substituted by a basic ether group of the formula described below and in which the monophenyl substituted carbon atom in the ethanol, ethylene or ethane group is linked to one or two hydrogen atoms. The new compounds have the formula

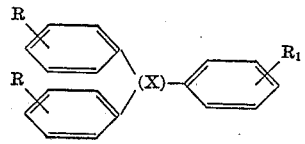

in which X is an ethanol (COHCH$_2$), ethylene (C=CH) or ethane (CHCH$_2$) group and in which one of the groups represented by R is a basic ether group of the formula —OC$_n$H$_{2n}$A, wherein $n$ is 2, 3 or 4 and A is a N-piperidino, N-morpholino, N-pyrrolidino or a 4-methyl-1-piperazino group. The group —OC$_n$H$_{2n}$A is attached to a benzene ring by the oxygen atom in the para position to the point of attachment of the benzene ring to the ethanol, ethylene or ethane group. The remaining R and R$_1$ groups are hydrogen, halogen, methyl or methoxy.

The new ethanols can be prepared by reacting a substituted benzylmagnesium bromide or chloride with a benzophenone substituted with a —OC$_n$H$_{2n}$A group. The benzophenone is obtained by reacting an alkali metal salt of a hydroxybenzophenone with a haloalkyl heterocyclic such as chloroethyl piperidine. The ethanols can also be prepared by first preparing the corresponding ethanol containing a —OC$_n$H$_{2n}$X group (where X is halogen) and reacting this ethanol with a reagent prepared from a lithium alkyl and a heterocyclic such as pyrrolidine. The ethanol containing the —OC$_n$H$_{2n}$X group can be prepared by reacting an alkali metal salt of a hydroxybenzophenone with an alkyl dihalide to form a benzophenone containing a —OC$_n$H$_{2n}$X group followed by reaction with a substituted benzylmagnesium bromide or chloride. The new ethanols have the formula

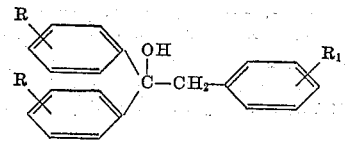

wherein R and R$_1$ have the meanings described above.

The new ethylenes are prepared by dehydrating the above ethanols by the use of mineral acids such as hydrochloric, hydrobromic or phosphoric acids. They have the formula

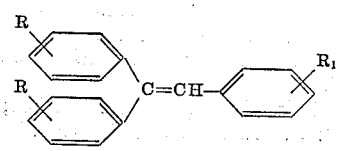

wherein R and R$_1$ have the meanings described above.

The new ethanes are prepared by hydrogenation of the above ethylenes. The new ethanes have the formula

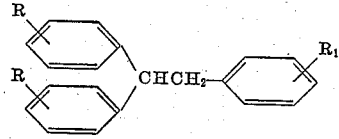

wherein R and R$_1$ have the meanings described above.

The compounds of our invention will be further illustrated by reference to the following examples.

EXAMPLE 1

*1 - [p - (β - morpholinoethoxy)phenyl] - 1,2 - diphenylethanol.*—The Grignard of 26 g. of benzyl chloride in 250 ml. of dry ether was added to 51 g. of 4-(β-morpholinoethoxy)benzophenone in 100 ml. of dry benzene, and after an hour of stirring was decomposed with 10 percent ammonium chloride solution. The organic layer was dried over anhydrous magnesium sulfate, the solvent was replaced with ether whereupon 1-[p-(β-morpholinoethoxy)-phenyl]-1,2-diphenylethanol separated, melting at 113–114° C.

*Analysis.*—Calcd. for C$_{26}$H$_{29}$NO$_3$: C, 77.40; H, 7.25; N, 3.47. Found: C, 77.11; H, 7.28; N, 3.67.

This compound exhibits uterotrophic activity.

The 4-(β-morpholinoethoxy)benzophenone was prepared by refluxing 16 hours a mixture of 100 g. of 4-hydroxybenzophenone and 29 g. of sodium methoxide in 400 ml. of ethanol with a solution of N-β-chloroethyl-morpholine (prepared from 100 g. of the hydrochloride salt) in 200 ml. of benzene. The solvents and precipitated sodium chloride were removed, the residue was taken up in ether, washed with 10 percent sodium hydroxide, then water and dried over magnesium sulfate. While removing ether, the 4-(β-morpholinoethoxy)benzophenone separated, giving 121 g., melting at 83–84° C.

Analysis.—Calcd. for $C_{19}H_{21}NO_3$: C, 73.28; H, 6.80; N, 4.50. Found: C, 73.03; H, 7.19; N, 4.76.

EXAMPLE 2

*1 - [p - (β - morpholinoethoxy)phenyl] - 1 - phenyl-2-p-anisylethanol.*—When the procedure of Example 1 was followed, using p-methoxybenzyl chloride in place of benzyl chloride, the solid which separated while decomposing the reaction mixture with ammonium chloride was dissolved in chloroform, washed with water, dried over magnesium sulfate and most of the chloroform was removed. When the solution was diluted with ether, 1-[p - (β - morpholinoethoxy)phenyl] - 1 - phenyl - 2 - p-anisylethanol separated, melting at 154–155° C.

Analysis.—Calcd. for $C_{27}H_{31}NO_4$: C, 74.80; H, 7.21; N, 3.23. Found: C, 74.70; H, 7.31; N, 3.34.

This compound exhibits uterotrophic estrogen antagonist activity.

EXAMPLE 3

*1 - [p - (β - piperidinoethoxy)phenyl] - 1 - phenyl - 2-p-anisylethanol.*—By following the procedure of Example 1 in the reaction between p-methoxybenzylmagnesium chloride and 4-(β-piperidinoethoxy)benzophenone, there was obtained 1-[p-(β-piperidinoethoxy)phenyl]-1-phenyl-2-p-anisylethanol, melting at 123–125° C. (from methanol).

Analysis.—Calcd. for $C_{28}H_{33}NO_3$: C, 77.92; H, 7.70; N, 3.25. Found: C, 77.98; H, 7.53; N, 3.30.

This compound exhibits uterotrophic estrogenic estrogen antagonist activity.

The 4-(β-piperidinoethoxy)benzophenone was prepared by using N-β-chloroethylpiperidine as the aminoalkyl halide in the procedure described in Example 1. This ketone was a liquid, boiling at 225–226° C. at 1.5 mm., $n_D^{25}$=1.5915.

Analysis.—Calcd. for $C_{20}H_{23}NO_2$: C, 77.64; H, 7.49; N, 4.53. Found: C, 77.34; H, 7.53; N, 4.62.

EXAMPLE 4

*1 - [p - (β - 4 - methylpiperazinoethoxy)phenyl] - 1-p-tolyl-2-p-chlorophenyl-ethanol.*—To the Grignard reagent prepared from 40 g. of p-chlorobenzyl chloride in 500 ml. of dry ether was added a solution of 68 g. of 4-(β-4-methylpiperazinoethoxy)-4'-methylbenzophenone in 300 ml. of dry benzene and most of the ether was allowed to boil off over a period of two hours. The solution was decomposed with dilute ammonium chloride solution, then dried over anhydrous potassium carbonate and removed the benzene. The residual oil was dissolved in 300 ml. of butanone and added to a solution of 47 g. of maleic acid in 200 ml. of ethanol. The solid was collected, washed with water, then methanol and finally with ether to give the di-maleate salt of 1-[p-(β-4-methylpiperazinoethoxy)phenyl] - 1 - p - tolyl - 2 - p - chlorophenylethanol, melting with decomposition at 200° C.

Analysis.—Calcd. for $C_{28}H_{33}ClN_2O_2 \cdot 2C_4H_4O_4$: C, 62.03; H, 5.93; N, 4.02. Found: C, 61.74; H, 6.22; N, 4.02.

This compound exhibits uterotrophic activity.

The 4-(β-4-methylpiperazinoethoxy)-4'-methylbenzophenone was prepared as follows: a mixture of 54.2 g. of 4-hydroxy-4'-methylbenzophenone and 14.5 g. of sodium methoxide in 100 ml. of methanol was heated until all the methanol had been removed. The solid was suspended in 200 ml. of boiling xylene and a solution of 4-methyl-1-(β-chloroethyl) piperazine (prepared from 80 g. of the dihydrochloride salt) in 200 ml. of xylene was added. After refluxing 20 hours, the solution was washed with 10 percent sodium hydroxide, three times with water, dried over magnesium sulfate and the solvent was replaced with ether. There was obtained 68 g. of 4-(β-4-methylpiperazinoethoxy) - 4' - methylbenzophenone, melting at 102–103° C.

Analysis.—Calcd. for $C_{21}H_{26}N_2O_2$: C, 74.52; H, 7.75; N, 8.28. Found: C, 74.37; H, 7.65; N, 8.46.

EXAMPLE 5

*1 - [p - (γ-piperidinopropoxy)phenyl] - 1 - p - chlorophenyl)-2-p-tolylethanol.*—The Grignard reagent prepared from 80.5 g. of p-xylyl bromide in 500 ml. of dry ether (by adding to a suspension of 20 g. each of magnesium turnings and powder in 500 ml. ether) was added to a solution of 120 g. of 4-(γ-piperidinopropoxy)-4'-chlorobenzophenone in 500 ml. of dry benzene. After stirring two hours, decomposing with ammonium chloride solution and drying over magnesium sulfate, the solvent was replaced with ether and by diluting with 40–60° petroleum ether, 1 - [p - (γ - piperidinopropoxy)phenyl] - 1 - p-chlorophenyl-2-p-tolylethanol was obtained, melting at 108–110° C.

Analysis.—Calcd. for $C_{29}H_{34}ClNO_2$: C, 75.06; H, 7.39; N, 3.02. Found: C, 74.54; H, 7.27; N, 3.20.

The 4 - (γ - piperidinopropoxy)-4'-chlorobenzophenone was prepared by refluxing 109 g. of the sodium derivative of 4-hydroxy-4'-chlorobenzophenone in 200 ml. of dry benzene with 300 ml. of a toluene solution containing γ-piperidinopropyl chloride (from 105 g. of the hydrochloride salt) for five hours, allowing the benzene to boil off during that time. The toluene was replaced with methylene chloride and this solution was washed with 10 percent sodium hydroxide solution, three times with water, dried, removed most of the solvent and diluted with ether. There was obtained 120 g. of 4-(γ-piperidinopropoxy)-4'-chlorobenzophenone, melting at 114–115° C.

Analysis.—Calcd. for $C_{21}H_{24}ClNO_2$: C, 70.48; H, 6.76; N, 9.91. Found: C, 69.92; H, 6.80; N, 9.95.

EXAMPLE 6

*1 - [p - (α - pyrrolidinobutoxy)phenyl] - 1 - phenyl-2-p-anisylethanol.*—Butyl lithium prepared from 11.2 g. of lithium wire in 800 ml. dry ether and 110 g. butyl bromide was allowed to react with 53.3 g. of dry pyrrolidine. To this solution was added a solution of 92 g. of 1-[p-(α - chlorobutoxy)-phenyl]-1-phenyl-2-p-anisylethanol in 400 ml. of dry benzene. The ether was removed and the reaction mixture was refluxed for 24 hours. The mixture was decomposed on ice, the aqueous layer was extracted three times with ether and the organic layers were dried over potassium carbonate. The solvent was replaced with 200 ml. of butanone and this solution was added to a solution of 42 g. of citric acid in 200 ml. of ethanol. The solid was recrystallized from ethanol-ethyl acetate to give the dihydrogen citrate salt of 1-[p - (α - pyrrolidinobutoxy)phenyl] - 1-phenyl-2-p-anisylethanol, melting with decomposition at 72° C.

Analysis.—Calcd. for $C_{29}H_{35}NO_3 \cdot C_6H_8O_7$: C, 65.92; H, 6.80; N, 2.20. Found: C, 65.59; H, 7.02; N, 2.54.

This compound exhibits uterotrophic estrogen antagonist activity.

The 1 - [p - (α - chlorobutoxy)phenyl] - 1 - phenyl-2-p-anisylethanol was prepared from p-methoxybenzylmagnesium chloride and 4-(δ-chlorobutoxy)benzophenone and melted at 112° C. (from ether), as described in Example 14 of our pending application Serial No. 559,343, filed July 23, 1956, now abandoned.

EXAMPLE 7

*1-[p-(β-morpholinoethoxy)phenyl]-1,2 - diphenylethylene.*—A solution of 31 g. of 1-[p-(β-morpholinoethoxy)

phenyl]-1,2-diphenylethanol (compound of Example 1) in 200 ml. of alcohol containing an excess of anhydrous hydrogen chloride was refluxed for an hour. The solvent and excess hydrogen chloride were removed under vacuum and the residue was dissolved in hot ethyl acetate containing a little methanol. Crystals of the hydrochloride salt of 1-[p-(β-morpholinoethoxy)phenyl]-1,2-diphenylethylene were obtained which melted at 151–181° C.

*Analysis.*—Calcd. for $C_{26}H_{27}NO_2 \cdot HCl$: C, 74.00; H, 6.69; N, 3.32. Found: C, 73.92; H, 6.50; N, 3.31.

This compound exhibits uterotrophic estrogenic and anti-inflammatory activity.

EXAMPLE 8

*1 - [p - (β - morpholinoethoxy)phenyl] - 1 - phenyl-2-p-anisylethylene.*—When the ethanol of Example 2 was dehydrated as in the procedure of Example 7, the hydrochloride salt of 1-[p-(β-morpholinoethoxy)phenyl]-1-phenyl-2-p-anisylethylene was obtained, melting at 210° C.

*Analysis.*—Calcd. for $C_{27}H_{29}NO_3 \cdot HCl$: C, 71.75; H, 6.69; N, 3.10. Found: C, 71.71; H, 7.22; N, 3.15.

This compound exhibits uterotrophic estrogen antagonist and anti-inflammatory activity.

EXAMPLE 9

*1 - [p - (β - piperidinoethoxy)phenyl] - 1 - phenyl - 2-p-anisylethylene.*—A solution of 49 g. of the ethanol of Example 3 in 400 ml. of 10 percent hydrochloric acid was heated on the steam bath for an hour, then extracted with chloroform, washed with water and dried over magnesium sulfate. The solvent was removed and the residue was crystallized from isopropanol, then from acetone and methylene chloride to give the hydrochloride salt of 1-[p-(β-piperidinoethoxy)phenyl]-1-phenyl-2-p-anisylethylene, melting at 188–191° C.

*Analysis.*—Calcd. for $C_{28}H_{31}NO_2 \cdot HCl$: C, 74.73; H, 7.17; N, 3.11. Found: C, 74.56; H, 7.31; N, 3.09.

This compound exhibits uterotrophic estrogen antagonist and anti-inflammatory activity.

EXAMPLE 10

*1 - [p - (β-4-methylpiperazinoethoxy)phenyl]-1-p-tolyl-2-p-chlorophenylethylene.*—A mixture of 80 g. of the dimaleate salt of the ethanol of Example 4 and an excess of 10 percent sodium hydroxide solution was extracted with ether, the ether solution was dried over magnesium sulfate and the solvent was removed. The residue was dehydrated as in the procedure of Example 7 from which was obtained the dihydrochloride of 1-[p-(β-4-methylpiperazinoethoxy)phenyl] - 1 - p - tolyl-2-p-chlorophenyl - ethylene, melting at 227–240° C. (from isopropanol-ethyl acetate).

*Analysis.*—Calcd. for $C_{28}H_{31}ClN_2O \cdot 2HCl$: C, 64.67; H, 6.40; N, 5.39. Found: C, 64.42; H, 6.76; N, 5.33.

EXAMPLE 11

*1 - [p-(γ-piperidinopropoxy)phenyl]-1-p-chlorophenyl-2-p-tolylethylene.*—The ethanol of Example 5 was dehydrated according to the procedure of Example 7. The hydrochloride salt of 1-[p-(γ-piperidinopropoxy)phenyl]-1-p-chlorophenyl-2-p-tolylethylene was obtained, melting at 173–185° C. (from isopropanol-methanol).

*Analysis.*—Calcd. for $C_{29}H_{32}ClNO \cdot HCl \cdot H_2O$: C, 69.58; H, 7.05; Cl, 7.09. Found: C, 69.59; H, 7.19; Cl, 7.23.

EXAMPLE 12

*1 - [p - (δ - pyrrolidinobutoxy)phenyl] - 1-phenyl - 2-p-anisylethylene.*—The procedure of Example 10 was used on the citrate salt of the ethanol of Example 6 whereupon the hydrochloride salt of the ethylene was obtained. The free base, obtained by neutralizing an aqueous solution with 10 percent sodium hydroxide, was extracted with ether, the ether was replaced with butanone and this solution was added to an alcoholic solution of citric acid. The dihydrogen citrate salt of 1-[p-(δ-pyrrolidinobutoxy)-phenyl]-1-phenyl - 2 - p - anisylethylene was obtained, decomposing at 65° C.

*Analysis.*—Calcd. for $C_{29}H_{33}NO_2 \cdot C_6H_8O_7$: C, 67.83; H, 6.67; N, 2.26. Found: C, 67.28; H, 6.71; N, 2.28.

EXAMPLE 13

*1-[p-(β-morpholinoethoxy)phenyl]-1-phenyl-2-p-anisylethane.*—A mixture of 21 g. of the hydrochloride salt of the ethylene of Example 8 and 3 g. of 10 percent palladium on charcoal in 200 ml. of ethanol was hydrogenated at 3 atmospheres at 50° C. The theoretical amount of hydrogen was consumed in 10 hours. The catalyst was removed by filtration and the ethanol was replaced with isopropanol from which was obtained the hydrochloride salt of 1-[p-(β-morpholinoethoxy)phenyl]-1-phenyl-2-p-anisylethane, melting at 155–156° C.

*Analysis.*—Calcd. for $C_{27}H_{31}NO_3 \cdot HCl$: C, 71.41; H, 7.10; N, 3.08. Found: C, 71.36; H, 7.10; N, 3.47.

This compound exhibits uterotrophic estrogenic estrogen antagonist activity.

EXAMPLE 14

*1-[p-(β-piperidinoethoxy)phenyl]-1-phenyl-2- p-anisylethane.*—A mixture of 20 g. of the hydrochloride salt of the ethylene of Example 9 and 0.3 g. of $PtO_2$ in 200 ml. of ethanol was hydrogenated at room temperature and at 3 atmospheres. In four hours the theoretical amount of hydrogen had been consumed. Removing the catalyst and replacing the solvent with isopropanol gave the hydrochloride salt of 1-[p-(β-piperidinoethoxy)phenyl]-1-phenyl-2-p-anisylethane, melting at 182–185° C.

*Analysis.*—Calcd. for $C_{28}H_{33}NO_2 \cdot HCl$: C, 74.40; H, 7.58; N, 3.10. Found: C, 74.13; H, 7.63; N, 3.15.

This compound exhibits uterotrophic estrogenic estrogen antagonist and anti-inflammatory activities and activity in decreasing blood cholesterol levels.

EXAMPLE 15

*1-[p-(β-4-methylpiperazinoethoxy)phenyl]-1-p-tolyl-2-p-chlorophenylethane.*—Following the procedure of Example 13, the dihydrochloride salt of the ethylene of Example 10 was hydrogenated to give the dihydrochloride salt of 1-[p-(β-4-methylpiperazinoethoxy)phenyl]-1-p-tolyl-2-p-chlorophenylethane, melting at 225–235° C. (dec.).

*Analysis.*—Calcd. for $C_{28}H_{33}ClN_2O \cdot 2HCl$: C, 64.41; H, 6.76; N, 5.37. Found: C, 64.19; H, 6.91; N, 5.22.

EXAMPLE 16

*1-[p-(γ-piperidinopropoxy)phenyl]-1-p-chlorophenyl-2-p-tolylethane.*—Following the procedure of Example 13, the hydrochloride salt of the ethylene of Example 11 was hydrogenated to give the hydrochloride salt of 1-[p-(γ-piperidinopropoxy)phenyl]-1-p-chlorophenyl-2 - p-tolylethane, melting at 158–60° C.

*Analysis.*—Calcd. for $C_{29}H_{34}ClNO \cdot HCl$: C, 71.90; H, 7.28; N, 2.89. Found: C, 71.62; H, 7.54; N, 3.19.

All of the compounds of the above examples exhibited the activity described for each when administered parenterally (subcutaneously). Also, the compound of Example 9 exhibited anti-inflammatory activity when administered orally. The compounds exhibited the activity in tests on mice and rats.

The compounds of the invention are useful in treating the above-described disorders in humans and are also useful in treating animals such as dogs, cattle and horses for inflammatory disorders, fertility and sterility problems, hyperestrogenism and related disorders, and atherosclerosis.

The following examples illustrate suitable pharmaceutical compositions containing the new compounds. In these examples, the quantities are given for single units, it being understood that in actual practice, the dosage forms will be prepared in suitable quantities, and the amounts of materials used adjusted accordingly.

EXAMPLE 17

*25 mg. tablets.*—Twenty-five mg. of the hydrochloride of 1-[p-(β-morpholinoethoxy)phenyl]-1-phenol-2-p-anisylethylene (Example 8), 48 mg. of powdered sugar, and 32 mg. of corn starch are mixed and granulated with 10 percent gelatin solution. The granulation is dried and ground to fine granules for tableting. About 1 percent magnesium stearate is added as a lubricant, together with sufficient corn starch to give a weight of 2.5 grains per tablet. The product is compressed on a single punch or rotary machine using a $^{9}/_{32}$ inch punch.

EXAMPLE 18

*500 mg. tablets.*—Five hundred mg. of the hydrochloride of 1-[p-(β-piperidinoethoxy)phenyl]-1-phenyl-2-p-anisylethylene (Example 9) in finely powdered form is admixed with 60 mg. of corn starch and 100 mg. of powdered sugar and then granulated with 10 percent gelatin solution. The granulation is dried and ground to size suitable for tableting. About 1 percent magnesium stearate is added as a lubricant, together with sufficient corn starch to give a weight of 700 mg. per tablet. The product is compressed on a single punch or rotary machine using a $^{7}/_{16}$ inch punch.

The tablets of Example 17 and Example 18 may be suitably coated if desired, as, for example, with sugar.

EXAMPLE 19

*Capsule.*—Twenty-five mg. of 1-[p-(β-piperidinoethoxy)phenyl]-1-phenyl-2-p-anisylethanol (Example 3) is admixed with corn starch in quantity required to provide sufficient bulk for the desired size capsule, and the mixture is encapsulated.

EXAMPLE 20

*Capsule.*—Five hundred mg. of the hydrochloride of 1-[p-(β-piperidinoethoxy)phenyl]-1-phenyl-2-p-anisylethane (Example 14) is admixed with sufficient corn starch to give the proper bulk for the desired size capsule, and the mixture is encapsulated.

EXAMPLE 21

*Injectable suspension, 100 mg. per ml.*—The following ingredients are sterilized separately: 100 mg. of hydrochloride of 1-[p-(β-morpholinoethoxy)phenyl]-1-phenyl-2-p-anisylethylene (Example 8), 0.1 mg. of Tween 80 and q.s. corn oil to make a final volume of one ml. These ingredients are admixed aseptically. Particle size may be achieved by use of micronized material or by use of a ball mill, maintaining aseptic conditions. The above suspension may be administered subcutaneously and intramuscularly.

EXAMPLE 22

*Oral suspension, 700 mg. per 15 ml.*—One hundred fifty mg. of Veegum H.V. are hydrated in about 9 ml. of water; 500 mg. of Tween 80, 700 mg. of 1-[p-(β-piperidinoethoxy)phenyl]-1-phenyl-2-p-anisylethanol (Example 3), color and flavor, as desired, and water q.s. 15 ml. are added; the product is mixed well and homogenized.

EXAMPLE 23

*Liquid (syrup) 25 mg. per teaspoon.*—Twenty-five mg. of the hydrochloride of 1-[p-(β-piperidinoethoxy)phenyl]-1-phenyl-2-p-anisylethylene (Example 9) is dissolved in one ml. of water. Five mg. of sodium benzoate, 3.5 ml. of liquid sugar, 5 mg. of citric acid, and 0.375 ml of butoben are added and stirred until dissolved, using gentle heat if necessary. Flavor, as desired, and water q.s. are then added.

EXAMPLE 24

*Liquid (syrup) 500 mg. per tablespoon.*—Five hundred mg. of the hydrochloride of 1-[p-(β-morpholinoethoxy)phenyl]-1-phenyl-2-p-anisylethylene (Example 8) and 4.5 mg. of sugar are dissolved in sufficient water so that after the addition of 2.25 ml. of alcohol USP and flavor, as desired, the volume is 15 ml.

EXAMPLE 25

*Injectable solution, 100 mg. per ml.*—One hundred mg. of the hydrochloride of 1-[p-(β-morpholinoethoxy)phenyl]-1-phenyl-2-p-anisylethylene (Example 8) and water for injection q.s. one ml. are mixed and warmed gently till solution is accomplished. The solution is filtered through an 03 porosity Selas filter; using sterilized equipment under aseptic conditions, and is used freshly made-up for injection.

EXAMPLE 26

*1% ointment.*—To a melt of 1.5 lbs. of propylene glycol 6.68 lbs. of polyethylene glycol 400 USP and 6.68 lbs. of carbowax 4000 USP is added 0.15 lb. of micropulverized hydrochloride of 1-[p-(β-piperidinoethoxy)phenyl]-1-phenyl-2-p-anisylethane (Example 14). The product is stirred until almost solid and milled if necessary to a smooth ointment. Fill in suitable containers.

EXAMPLE 27

*10% ointment.*—To a melt of 1.5 lbs. of propylene glycol, 6 lbs of polyethylene glycol 400 USP and 6 lbs. carbowax 4000 USP is added 1.5 lbs. of micropulverized hydrochloride of 1-[p-(β-piperidinoethoxy)phenyl]-1-phenyl-2-p-anisylethane (Example 14). The product is stirred until almost solid and milled if necessary to a smooth ointment. Fill in suitable containers.

The other compounds of Examples 1 to 16 can also be used to prepare pharmaceutical compositions such as those of Examples 17 to 27.

This application is a continuation-in-part of our pending applications Serial No. 599,343, filed July 23, 1956 now abandoned, and Serial No. 620,570, filed November 6, 1956 now abandoned.

We claim:

1. Compounds of the formula

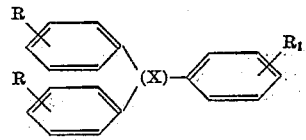

wherein X is selected from the groups (COHCH$_2$), (C=CH) and (CHCH$_2$), wherein only one of the groups represented by R is a group of the formula —OC$_n$H$_{2n}$A, attached by the oxygen atom to the benzene ring in the para position to the point of attachment of the benzene ring to the carbon atom of the X group, wherein n is an integer of 2 to 4 and A is selected from the group consisting of N-piperidino, N-morpholino, N-pyrrolidino and 4-methyl-1-piperazino, and wherein the remaining R group and the R$_1$ group are selected from the group consisting of hydrogen, halogen, methyl and methoxy, in the para position.

2. 1 - [p - (β-morpholinoethoxy)phenyl]-1,2-diphenylethanol.

3. 1 - [p - (β - morpholinoethoxy)phenyl] - 1 - phenyl-2-p-anisylethanol.

4. 1 - [p - (δ - pyrrolidinobutoxy)phenyl] - 1 - phenyl-2-p-anisylethylene.

5. 1 - [p - (β - piperidinoethoxy)phenyl] - 1 - phenyl-2-p-anisylethane.

6. 1 - [p - (β - 4 - methylpiperazinoethoxy)phenyl - 1-p-tolyl-2-p-chlorophenylethane.

References Cited in the file of this patent

UNITED STATES PATENTS

| | | |
|---|---|---|
| 2,703,324 | Birkley et al. | Mar. 1, 1955 |
| 2,877,269 | Van Campen et al. | Mar. 10, 1959 |